Figure 1:
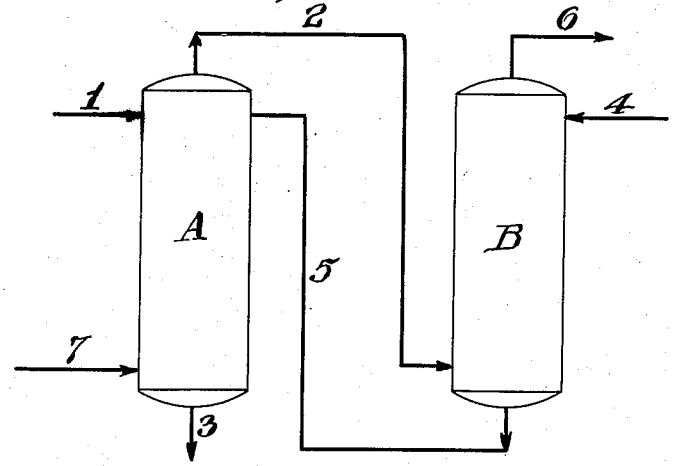

April 27, 1954

E. J. GOETT ET AL 2,676,960

SOLVENT EXTRACTION OF STREPTOMYCIN

Filed April 14, 1949

INVENTORS
EDWARD J. GOETT and
ROY J. TAYLOR
BY

THEIR ATTORNEY

Patented Apr. 27, 1954

2,676,960

UNITED STATES PATENT OFFICE 2,676,960

SOLVENT EXTRACTION OF STREPTOMYCIN

Edward J. Goett, Bronx, and Roy J. Taylor, Kew Gardens Hills, N. Y., assignors to Chas. Pfizer & Co., Inc., Brooklyn, N. Y., a corporation of New Jersey Application April 14, 1949, Serial No. 87,526

5 Claims. (Cl. 260—210)

This invention relates to a process for the purification of streptomycin, and more particularly, to a process for the separation of streptomycin from other mold elaboration products associated therewith in fermentation broth.

It is known that streptomycin can be obtained from the elaboration products of *Actinomyces griseus* by adsorption on activated carbon followed by elution with an acidic solvent, such as acidified water or methanol. Streptomycin can also be recovered from the culture medium and other aqueous solutions by precipitation of its insoluble salts, such as those which it forms with certain azosulfonic acid dyes, for example, Congo red and Methyl orange. The separated salts can then be converted to streptomycin by suitable procedures. By these techniques, the streptomycin is obtained as a crude product such as streptomycin hydrochloride of relatively low activity or potency. The potency of this antibiotic is determined by biological methods in terms of the inhibition of growth of microorganisms such as *E. coli* and *B. subtilis* in comparison with a standard of known activity (J. Biol. Chem. 153, 249 (1944); J. Bact. 47, 199 (1944)). The potency or activity may also be determined chemically by measuring the amount of maltol formed upon alkaline hydrolysis of streptomycin, or by testing for the guanido grouping in the streptidine moiety of the molecule.

The crude streptomycin salt can be further purified by chromatography from methanol or aqueous methanol on an acid-washed alumina column (J. Biol. Chem. 160, 337 (1945)). It may also be further purified by preparation and recrystallization of the reineckate, reineckate sulfate, or helianthate. The streptomycin obtained by the subsequent conversion of these compounds to the desired mineral acid salt is substantially pure streptomycin. Pure streptomycin has also been obtained by crystallization of the streptomycin trihydrochloride-calcium chloride double salt (J. Am. Chem. Soc. 67, 1866 (1945)).

While streptomycin has been extracted from fermentation broths and subsequently purified by various combinations of the techniques described above, these methods suffer from certain inherent disadvantages. For example, when streptomycin is adsorbed on activated carbon, it is difficult or impossible to elute all of the streptomycin so adsorbed. Likewise, in precipitation methods, some streptomycin is lost in mother liquors which are either too dilute or contain too many impurities to be economically salvaged. Furthermore, in previously described streptomycin recovery processes, substantial losses of the antibiotic occur due to batch-to-batch variations in fermentation broths and inability without constant and time-consuming tests to use the optimum proportion of carbon or precipitating agent for each batch. In addition, from a commercial standpoint the batch method as practiced in known streptomycin recovery processes is less economical and adds considerably to the handling costs in the recovery of streptomycin from fermentation broth as compared with a recovery method which can be adapted for use in a continuous process.

An object of this invention is to provide a simple and expeditious method for extracting alkaline-reacting nitrogen-basic antibiotic substances from aqueous solution and purifying the antibiotic substance from impurities associated therewith. Another object is to provide an efficient and economical process for recovering alkaline-reacting nitrogen-basic antibiotic mold elaboration products, for example streptomycin, from fermentation broths and separating these products from closely related impurities. A further object is to provide a solvent extraction process for the recovery of streptomycin from its aqueous solutions and its separation from closely related impurities, such as mannosidostreptomycin. A still further object is to provide a solvent extraction process adapted for continuous operation for the recovery of streptomycin from aqueous solutions and its separation from closely related impurities. Further objects will appear hereinafter.

It has now been found that streptomycin can be separated from other mold elaboration products associated therewith in fermentation broth by converting it to an alcohol-soluble carboxylic acid salt. This is accomplished, for example, by adding a sodium, potassium, ammonium or other water-soluble salt of an organic monocarboxylic acid of 4–18 carbon atoms to the aqueous solution containing a water-soluble mineral acid salt of streptomycin. The resulting aqueous solution is extracted with an organic solvent, such as an aliphatic monohydric alcohol of 4–6 carbon atoms. The alcohol extract is washed with water or a dilute aqueous solution of an alkali metal halide to produce the streptomycin salt of the organic monocarboxylic acid in relatively pure form dissolved in the alcohol. This salt can be recovered as such from the solution, or alternatively, the alcohol solution of the streptomycin salt can be thoroughly mixed with an aqueous solution of a strong mineral acid e. g. sulfuric or hydrochloric acid, and the streptomycin salt of the mineral acid e. g. the sulfate or hydrochloride respectively can be recovered in pure form from the aqueous solution.

In a preferred and unexpectedly effective embodiment, the process of this invention comprises two major steps as follows:

1. A continuous extraction of streptomycin from aqueous solution into a solvent incompletely miscible therewith, by the addition of a sodium, potassium or ammonium salt of an organic monocarboxylic acid of 4–18 carbon atoms to the aqueous solution containing a water-soluble mineral acid salt of streptomycin and counter-currently extracting this streptomycin solution with an aliphatic monohydric alcohol of 4–6 carbon atoms to obtain an alcohol solution of the alcohol-soluble carboxylic acid salt of streptomycin.

2. A continuous counter-current washing of the alcohol solution containing the extracted streptomycin monocarboxylic acid salt with water or with an aqueous solution of a water-soluble inorganic salt e. g. sodium chloride, thereby removing from the solvent a major proportion of the mannosidostreptomycin, other impurities and some alcohol extracting agent together with a minor proportion of the streptomycin, and recycling the aqueous solution so produced to the feed solution of Step 1 to effect greater overall recovery of streptomycin.

The purified streptomycin can then be recovered from the solvent solution by various suitable procedures, for example, by treating the alcohol solution of the streptomycin monocarboxylic acid salt with an aqueous solution of a mineral acid, e. g. hydrochloric or sulfuric acid, which gives an aqueous solution of the purified mineral acid salt, e. g. the hydrochloride or sulfate of streptomycin from which the solid streptomycin salt can be obtained by suitable water removal procedures.

It is preferred to employ in this process the sodium, potassium or ammonium salt of organic solvent-soluble monocarboxylic acids of low water solubility. This permits the streptomycin to be extracted from the alcohol solvent into aqueous hydrochloric acid solution while leaving a major proportion of the monocarboxylic acid in the solvent phase.

In a practical application of the process of this invention, the usual devices for extraction by counter-current flow of two incompletely miscible liquids can be used. Examples of these devices are towers of the perforated-plate or packed type, centrifugal counter-current extractors and a series of alternate mixing tanks and settling tanks or separators. Although from a practical standpoint continuous flow is preferred, intermittent or batch operation can also be used.

Figure 2:
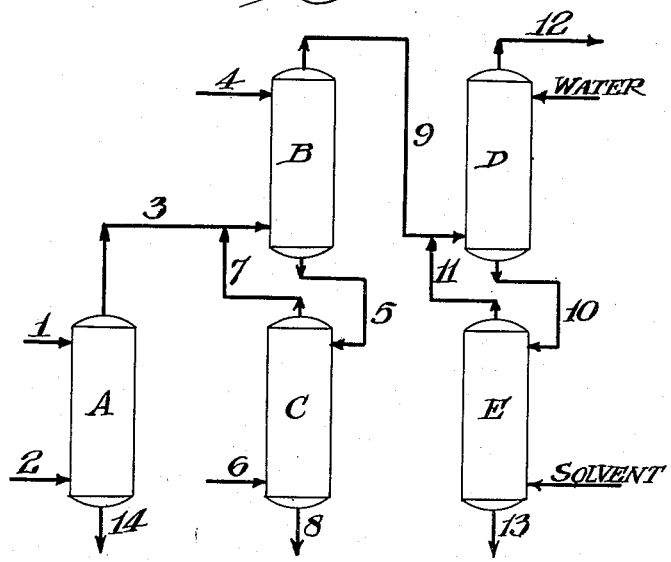

Figs. 1 and 2 are diagrammatic illustrations of two continuous methods whereby the present invention might be carried out on a commercial scale.

In one embodiment of the invention, illustrated in Fig. 1, an aqueous solution 1 of crude streptomycin containing added sodium benzoate flows downward through tower A in countercurrent contact with n-butanol 7 flowing upward. A major proportion of the streptomycin, along with a lesser proportion of the impurities, is extracted into the solvent. The solvent solution 2 leaves the top of tower A and travels up tower B, contacting a downward flow of water or dilute salt solution 4 which re-extracts a major proportion of the impurities including excess sodium benzoate and a minor proportion of the streptomycin. The aqueous extract solution 5 from the bottom of tower B is recycled to the top of tower A.

By suitable adjustment of the proportion of sodium benzoate and the relative flow rates of butanol and solutions 1 and 4, it is possible to eliminate most of the undesirable impurities, such as mannosidostreptomycin and streptidine, which leave the system in spent aqueous solution 3, thereby producing a solvent extract 6 containing streptomycin of substantially improved purity in the form of streptomycin benzoate.

Another embodiment of this invention is illustrated in Fig. 2. A dilute aqueous solution 1 containing streptomycin and undesirable impurities, such as that obtained by filtration of a culture of certain strains of *Actinomyces griseus*, and preferably adjusted to a pH of 7.5–8.5, is subjected to a preliminary counter-current extraction in tower A by a solution 2 of sodium stearate or commercial hard soap in a lower aliphatic alcohol containing 4–6 carbon atoms. The spent feed solution 14 passes out of the bottom of tower A and resulting solvent phase 3, containing the extracted streptomycin and organic impurities, along with excess sodium stearate, is introduced into tower B near the bottom and flows upward counter-current to an aqueous solution 4 of sodium chloride. The aqueous extract 5, containing a major proportion of organic impurities, such as mannosidostreptomycin, together with a lesser proportion of streptomycin and streptidine, enters tower C near the top and is counter-currently treated with another solution 6 of sodium stearate in a solvent, such as the amyl alcohols. The solvent phase 7 leaving tower C contains a major proportion of the streptomycin from solution 5 and a lesser proportion of the impurities and is preferably recycled to tower B as shown. The final aqueous solution 8 leaving the bottom of tower C contains most of the impurities and only a small proportion of the streptomycin entering tower B as solution 3.

The solvent solution 9 leaving the top of tower B contains streptomycin of substantially improved purity in the form of streptomycin stearate, but may still contain excess sodium stearate and streptidine. In towers D and E, most of the sodium stearate is eliminated with a minimum loss of streptomycin. Here, water is used as the extracting phase in tower D and fresh solvent (lower aliphatic alcohol of 4–6 carbon atoms) in tower E. In tower D, most of the sodium stearate, with a lesser proportion of streptomycin stearate is extracted into the water, and the aqueous solution 10 so produced is introduced into tower E, where a major proportion of its streptomycin is re-extracted into the solvent, producing solution 11 which is recycled to tower D. The aqueous solution 13 carrying the sodium stearate extracted in towers D and E passes out of the bottom of tower E.

The final solvent solution 12 leaving tower D is substantially free of sodium stearate and organic impurities such as mannosidostreptomycin and contains streptomycin stearate of improved purity, but may also contain streptidine stearate. By treatment with about one-tenth to one-quarter volume of water and sufficient sulfuric acid to produce a pH of preferably 3–6, the streptomycin and streptidine are extracted into the aqueous phase, leaving most of the resulting stearic acid in the solvent. By known procedures, the streptidine can be removed as the relatively water-insoluble sulfate and substantially purified streptomycin sulfate isolated.

The application of this invention is further shown by the following illustrative examples:

Example 1

An aqueous solution of crude streptomycin hydrochloride was obtained by treating filtered fermentation broth with a cation exchange resin, eluting the adsorbed streptomycin with an aqueous solution of hydrochloric acid and neutralizing with sodium hydroxide. Calcium salts were eliminated by adding disodium phosphate solution and filtering the precipitated calcium phosphate. To prevent precipitation of magnesium stearate during the following solvent extraction, about 1% of Quadrafos was added. Quadrafos is a trade name for sodium tetraphosphate $$(Na_6P_4O_{13})$$

The resulting solution assayed 5500 $\gamma$/ml. by *B. subtilis* plate test and constituted the feed solution for the solvent extraction process described below.

The solvent solution was prepared by stirring 1000 grams of commercial powdered hard soap with 10 liters of methylisobutyl carbinol, gradually adding 2 liters of water, stirring until the soap dissolved, and filtering off a small amount of insoluble material.

Ten separatory funnels numbered from 1 to 10 were used as the extracting stages. The soap-solvent, in 125-ml. increments, was introduced into stage 1 and mixed with the aqueous solution coming from stage 2. The resulting solvent phase was transferred to stage 2 to contact the aqueous phase coming from stage 3 etc. The aqueous feed solution of crude streptomycin was introduced into stage 5 in 250-ml. increments, along with the aqueous phase from stage 6. An aqueous solution containing 2.5% sodium chloride was added in 500-ml. portions to stage 10.

After reaching steady-state conditions, the streptomycin-rich solvent withdrawn from stage 10 assayed 10,700 $\gamma$/ml. and the aqueous phase leaving stage 1 assayed 167 $\gamma$/ml. (both assays by *B. subtilis*).

After extraction from stage 10 solvent with aqueous hydrochloric acid and subsequently removing sodium chloride and streptidine, the streptomycin hydrochloride was converted to the sulfate assaying 757 $\gamma$/mg.

Example 2

The procedure of Example 1 was repeated using butanol as the solvent and sodium benzoate in the feed solution. Feed rates were 180 ml. n-butanol to stage 1, 120 ml. crude streptomycin hydrochloride solution containing 8.4 grams sodium benzoate to stage 5 and 100 ml. water to stage 10. Summarized results are given below:

|  | *B. subtilis*, $\gamma$/ml. | Maltol, $\gamma$/ml. | Streptidine, $\gamma$/ml. |
| --- | --- | --- | --- |
| Feed | 8,640 | 8,800 | 12,000 |
| Extract (Stage 10) | 4,200 | 4,540 | 4,600 |
| Raffinate (Stage 1) | 900 | 1,600 | 2,700 |

A portion of the extract was shaken with aqueous sulfuric acid and the streptomycin precipitated as the sulfate by pouring the resulting aqueous solution into methanol. After drying, the product assayed 755 $\gamma$/mg. and contained 1.0% ash.

This process is surprisingly effective in separating streptomycin from mannosidostreptomycin, streptidine, histaminelike substances, and other organic impurities of unknown composition occurring as mold elaboration products. Many of these impurities produce harmful physiological effects, and consequently must be removed substantially completely from streptomycin preparations intended for therapeutic administration.

The carboxylic acid salts employed in the process of this invention are the sodium, potassium or ammonium salts of monocarboxylic acids containing from 4 to 18 carbon atoms. These include butyric, caproic, caprylic, lauric, palmitic, oleic and stearic acids in the aliphatic series, and benzoic, toluic and other substituted benzoic acids in the aromatic series. Also effective is the dibutyl ester of citric acid. In addition to the ammonium salts some amine salts, for example triethylamine salts, can be employed. The above-named salts of these acids all form aqueous solutions.

The organic acids are those of which the streptomycin salts are relatively insoluble in water, but more soluble in the alcohol solvent, and also those acids of which the streptomycin salts are soluble in both water and the alcohol solvent with at least a substantial proportion of the streptomycin salt of the acid distributed in the organic solvent phase when the solutions are mixed. Although the salts are the preferred form in which the acid is used, the free acid form can be used, for example, dissolved in the solvent, provided the aqueous solution has sufficient buffering action to produce the required proportion of salt form.

The streptomycin salts of the monocarboxylic acids of the above-named groups are readily reconverted to the desired inorganic salts, such as the hydrochloride, sulfate and phosphate. In place of the organic monocarboxylic acids, sulfonic acids can be employed in some instances.

In the solvent extraction process of this invention it is preferred to employ at least three molecular equivalents of the salt of the monocarboxylic acid for each molecular equivalent of streptomycin present in order to form the streptomycin tri salt of the monocarboxylic acid.

The alcohols employed in the extraction process are monohydric alcohols containing 4–6 carbon atoms, for example, n-butanol, isobutanol, methylethylcarbinol, the pentanols and methyl isobutyl carbinol and other hexanols. In place of these alcohols, other solvents of sufficient polarity to dissolve the streptomycin salt are useful, for example, the monophenyl ether of ethylene glycol. Sufficient amount of solvent must be present so that it is at least partly immiscible with the streptomycin solutions in order to obtain a separation of the aqueous and organic solvent phases.

While this description has been confined primarily to streptomycin isolation and purification, the features of this invention can also be applied to the purification of other alkaline-reacting nitrogenous antibiotic substances. In fact, mannosidostreptomycin, which is referred to as an impurity in the above description, is such an antibiotic substance and can be purified by suitable modifications of this invention. Thus, after removing streptomycin in the process illustrated in Figure 1, the mannosidostreptomycin is contained in solution 3. By introducing solution 3 into an intermediate stage in a second counter-current extraction system and using a higher ratio of solvent to aqueous phase, the mannosidostreptomycin can be extracted and purified in a manner analogous to streptomycin.

This invention provides a practical and an efficient method for separating streptomycin and related antibiotics from harmful impurities which are associated with them in the crude state.

As many apparently widely different embodiments of this invention may be made without departing from the spirit and scope hereof, it is to be understood that the invention is not limited to the specific embodiments hereof, except as defined in the appended claims.

We claim:

1. A continuous process for the purification of streptomycin salts which comprises reacting a stream of an aqueous solution of a mineral acid salt of streptomycin containing mold elaboration product impurities, with a water-soluble salt of a monocarboxylic acid of from 4–18 carbon atoms, in the presence of a countercurrently moving stream of an incompletely miscible organic solvent for the streptomycin monocarboxylic acid salt thus formed.

2. The process of claim 1 in which the organic solvent is a monohydric alcohol of from 4–6 carbon atoms.

3. The process of claim 1 in which a purified mineral acid salt of streptomycin is finally recovered by washing a stream of the organic solvent solution of streptomycin monocarboxylic acid salt with a counter-currently moving stream of water, then treating said solution with an aqueous solution of a strong mineral acid, and separating therefrom the purified mineral acid salt of streptomycin.

4. A continuous process for the purification of streptomycin salts which comprises mixing an aqueous solution of a mineral acid salt of streptomycin containing mold elaboration product impurities with a water-soluble salt of a monocarboxylic acid of from 4–18 carbon atoms to produce a streptomycin monocarboxylic acid salt and continuously contacting a stream of the admixture with a countercurrently moving stream of an incompletely miscible organic solvent for the streptomycin monocarboxylic acid salt.

5. A continuous process for the purification of streptomycin salts which comprises dissolving a water-soluble salt of a monocarboxylic acid of from 4–18 carbon atoms in a water-wet organic solvent for the corresponding streptomycin monocarboxylic acid salt and continuously contacting a stream of this solution with a countercurrently moving stream of an aqueous solution of a mineral acid salt of streptomycin containing mold elaboration product impurities.

References Cited in the file of this patent

UNITED STATES PATENTS

| Number | Name | Date |
|---|---|---|
| 2,462,175 | Folkers | Feb. 22, 1949 |
| 2,501,014 | Wintersteiner et al. | Mar. 21, 1950 |
| 2,537,933 | Lott et al. | Jan. 9, 1951 |

OTHER REFERENCES

Carter et al., J. Biol. Chem., vol. 160 (1945), page 339.

Jadassohn et al., Chem. Abs., vol. 42 (1948), page 8424c.

Experientia, vol. 4 (1948), page 225.

Perry, "Chemical Engineers' Handbook," Sec. Ed. 1941, pages 1216–19.